United States Patent
Morinaga et al.

(10) Patent No.: US 7,260,443 B2
(45) Date of Patent: Aug. 21, 2007

(54) SYSTEM AND PROGRAM FOR MAKING RECIPE AND METHOD FOR MANUFACTURING PRODUCTS BY USING RECIPE

(75) Inventors: Hiroyuki Morinaga, Yokohama (JP); Takema Ito, Yokohama (JP); Arata Inoue, Fujisawa (JP); Takuya Kono, Yokohama (JP); Takashi Sakamoto, Zushi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 34 days.

(21) Appl. No.: 11/170,690

(22) Filed: Jun. 30, 2005

(65) Prior Publication Data
US 2006/0020362 A1   Jan. 26, 2006

(30) Foreign Application Priority Data
Jul. 22, 2004   (JP)   ............................. 2004-214173

(51) Int. Cl.
G06F 19/00 (2006.01)
(52) U.S. Cl. ........................................ 700/121; 700/97
(58) Field of Classification Search ............ 700/28–31, 700/95–97, 108, 109, 117–121, 160, 161, 700/173, 174
See application file for complete search history.

(56) References Cited

U.S. PATENT DOCUMENTS

| | | | |
|---|---|---|---|
| 5,499,188 A | * | 3/1996 | Kline et al. ................. 700/106 |
| 5,993,043 A | | 11/1999 | Fujii |
| 6,000,830 A | * | 12/1999 | Asano et al. ................ 700/121 |
| 6,415,192 B1 | * | 7/2002 | Satoguchi ..................... 700/96 |
| 6,415,193 B1 | * | 7/2002 | Betawar et al. ................ 700/97 |
| 6,430,572 B1 | * | 8/2002 | Steffan et al. ........... 707/104.1 |
| 6,438,441 B1 | * | 8/2002 | Jang et al. ................... 700/121 |
| 6,732,007 B1 | * | 5/2004 | Pasadyn et al. ............. 700/121 |
| 6,834,370 B1 | * | 12/2004 | Brandl et al. ................ 715/500 |
| 6,907,308 B1 | * | 6/2005 | Bartlett et al. .............. 700/121 |
| 7,047,101 B1 | * | 5/2006 | Young et al. ................ 700/121 |
| 7,065,560 B2 | * | 6/2006 | Erickson et al. ............. 709/219 |
| 2003/0195779 A1 | * | 10/2003 | Scholl et al. ................... 705/7 |
| 2004/0078107 A1 | * | 4/2004 | Chou et al. ................. 700/121 |
| 2004/0207856 A1 | | 10/2004 | Sato et al. |

\* cited by examiner

*Primary Examiner*—M. N. Von Buhr
(74) *Attorney, Agent, or Firm*—Finnegan, Henderson, Farabow, Garrett & Dunner, L.L.P.

(57) ABSTRACT

A system for making a recipe for each of manufacturing tools used to manufacture products includes a merging unit merging product information for the products and process information for each of manufacturing processes used for the products to make intermediate recipe data, and a making unit making the recipe for each of the manufacturing tools by merging information of the intermediate recipe data and information of a basic recipe including information of parameters, which specify operations of the manufacturing tools and are commonly set in the manufacturing processes.

20 Claims, 12 Drawing Sheets

FIG. 2

| MANUFACTURING TOOL NAME:MANUFACTURING TOOL 101 ||
|---|---|
| PROCESS CONDITION: α ||
| MANUFACTURING PROCESS: A ||
| PARAMETER 1 | SETTING CONDITION 1 |
| PARAMETER 2 | SETTING CONDITION 2 |
| PARAMETER 3 | SETTING CONDITION 3 |
| PARAMETER 4 | SETTING CONDITION 4 |
| PARAMETER 5 | SETTING CONDITION 5 |

FIG. 3

| MANUFACTURING TOOL NAME | MANUFACTURING TOOL 101 | MANUFACTURING TOOL 102 | MANUFACTURING TOOL 103 |
|---|---|---|---|
| PARAMETER 1 | ○ | ○ | ○ |
| PARAMETER 2 | ○ | | |
| PARAMETER 3 | | ○ | |
| PARAMETER 4 | ○ | ○ | ○ |
| PARAMETER 5 | | | ○ |

FIG. 4

| MANUFACTURING TOOL NAME:MANUFACTURING TOOL 101 ||
|---|---|
| PRODUCT NAME : X ||
| MANUFACTURING PROCESS: A ||
| PARAMETER 11 | SETTING CONDITION 11 |
| PARAMETER 12 | SETTING CONDITION 12 |
| PARAMETER 13 | SETTING CONDITION 13 |
| PARAMETER 14 | SETTING CONDITION 14 |
| PARAMETER 15 | SETTING CONDITION 15 |

FIG. 5

| MANUFACTURING TOOL NAME: MANUFACTURING TOOL 101 |||
|---|---|---|
| PRODUCT NAME : X |||
| ALIGNMENT MARK | PARAMETER | DATA |
| MARK A | X COORDINATE | DATA 1 |
| | Y COORDINATE | DATA 2 |
| | DIMENSIONS | DATA 3 |
| MARK B | X COORDINATE | DATA 4 |
| | Y COORDINATE | DATA 5 |
| | DIMENSIONS | DATA 6 |
| MARK C | X COORDINATE | DATA 7 |
| | Y COORDINATE | DATA 8 |
| | DIMENSIONS | DATA 9 |
| MARK D | X COORDINATE | DATA 10 |
| | Y COORDINATE | DATA 11 |
| | DIMENSIONS | DATA 12 |

FIG. 6

| MANUFACTURING TOOL NAME: MANUFACTURING TOOL 101 |||
|---|---|---|
| PRODUCT NAME : X |||
| PARAMETER 111 | PARAMETER 112 | DATA |
| STEP PITCH | X | DATA 1 |
| | Y | DATA 2 |
| MAP OFFSET | X | DATA 3 |
| | Y | DATA 4 |
| SHOT COORDINATES 1 | X COORDINATE | DATA 5 |
| | Y COORDINATE | DATA 6 |
| SHOT COORDINATES 2 | X COORDINATE | DATA 7 |
| | Y COORDINATE | DATA 8 |

FIG. 7

| PROCESS CONDITION NAME | MANUFACTURING PROCESS NAME | MANUFACTURING TOOL NAME | BASIC RECIPE NAME |
|---|---|---|---|
| α1 | A1 | MANUFACTURING TOOL 101 | BASIC RECIPE 1 |
| α2 | A2 | MANUFACTURING TOOL 102 | BASIC RECIPE 2 |
| ⋮ | ⋮ | ⋮ | ⋮ |

| UPDATED DATE | PROCESS CONDITION NAME | MANUFACTURING PROCESS NAME | PRODUCT NAME | MANUFACTURING TOOL NAME | BASIC RECIPE NAME |
|---|---|---|---|---|---|
| DATE 1 | α1 | A1 | X1 | 101 | BASIC RECIPE 1 |
| DATE 2 | α2 | A2 | X2 | 102 | BASIC RECIPE 2 |
| ⋮ | ⋮ | ⋮ | ⋮ | ⋮ | ⋮ |

| PARAMETER | DATA |
|---|---|
| A | 1.345 |
| B | 2.456 |
| C | 4.567 |

| PARAMETER | DATA |
|---|---|
| B | 9.345 |

| PARAMETER | DATA |
|---|---|
| A | 1.345 |
| B | 9.345 |
| C | 4.567 |

- MEASURE AMOUNT OF MISALIGNMENT — S61
- CALCULATE DEVIATION IN AMOUNT OF MISALIGNMENT — S62
- DETERMINE NUMBER OF SAMPLING SHOTS — S63
- UPDATE PROCESS INFORMATION DATABASE — S64
- UPDATE RECIPE — S65

| DEVIATION | NUMBER OF SAMPLING SHOTS |
|---|---|
| LESS THAN $\sigma 1$ | k1 |
| $\sigma 1$ OR GREATER AND LESS THAN $\sigma 2$ | k2 |
| $\sigma 2$ OR GREATER | k3 |

FIG. 20
| UPDATED DATE | NEW/ MODIFICATION | SYSTEM NAME | PERSON | PARAMETER NAME | VALUE BEFORE UPDATING | VALUE AFTER UPDATING |
|---|---|---|---|---|---|---|
| ⋮ | ⋮ | ⋮ | ⋮ | ⋮ | ⋮ | ⋮ |
| REASON | PROCESS CONDITION NAME | MANUFACTURING PROCESS NAME | MANUFACTURING TOOL NAME |
|---|---|---|---|
| ⋮ | ⋮ | ⋮ | ⋮ |
FIG. 21
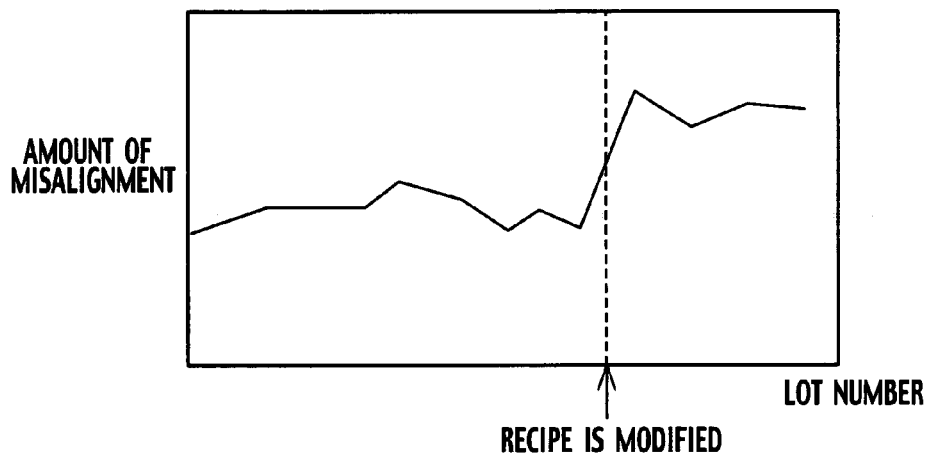
FIG. 22
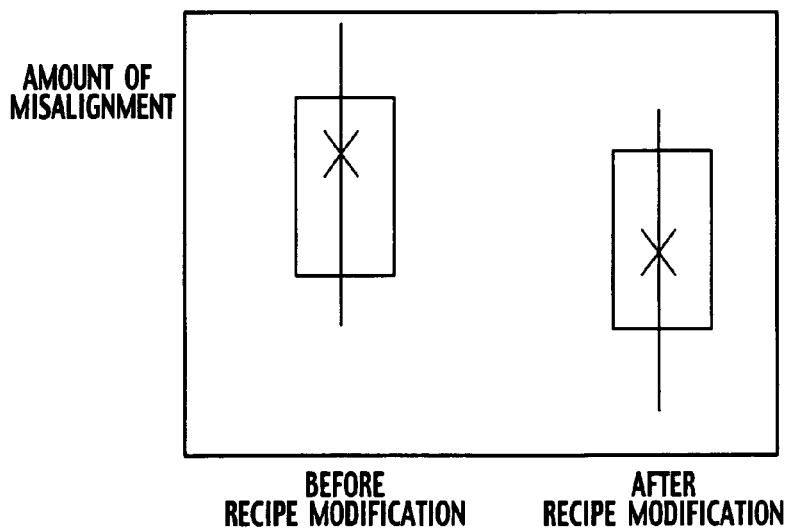

SYSTEM AND PROGRAM FOR MAKING RECIPE AND METHOD FOR MANUFACTURING PRODUCTS BY USING RECIPE

CROSS REFERENCE TO RELATED APPLICATIONS AND INCORPORATION BY REFERENCE

This application is based upon and claims the benefit of priority from prior Japanese Patent Application P2004-214173 filed on Jul. 22, 2004; the entire contents of which are incorporated by reference herein.

BACKGROUND OF THE INVENTION

1. Field of the Invention

The present invention relates to an automatic recipe making system and an automatic recipe making program for a manufacturing tool used to manufacture products, and a method for manufacturing products by using a recipe.

2. Description of the Related Art

Parameters used to specify operations of a manufacturing tool in respective manufacturing processes are specified. A set of those parameters is referred to as a 'recipe'. Products are manufactured using a manufacturing tool for which parameters have been set based on a recipe. Many parameters are set to correspond to a plurality of manufacturing tools used for respective manufacturing processes, thereby making a recipe. In addition, even if manufacturing tools are used for the same manufacturing process, the kinds of parameters, coordinate systems, and unit systems for parameters for respective manufacturing tools are often different from one another due to different manufacturers and models. This is required for making recipes for respective manufacturing tools. Consequently, problems occur, such as a long time to input parameters for making recipes and input errors. If a recipe includes erroneously input data, inappropriate parameter settings are used for manufacturing products, resulting in undesired product characteristics.

On the other hand, recipes may be modified to improve product characteristics and yield. When different people are in charge of respective manufacturing tools, a recipe is modified for each manufacturing tool, even though the manufacturing tools are for the same model. Since such modified data and technical know-how are not shared thereamong, results of recipe modification are not reflected in a recipe for the same model of another manufacturing tool. Furthermore, there has been a problem in that modified information is unavailable for making a recipe for a newly developed product.

SUMMARY OF THE INVENTION

An aspect of the present invention inheres in a system for making a recipe for each of a plurality of manufacturing tools configured to manufacture products. The system includes a merging unit configured to merge product information for the products and process information for each of a plurality of manufacturing processes used for the products to make intermediate recipe data; and a making unit configured to make the recipe for each of the manufacturing tools by merging information of the intermediate recipe data and information of a basic recipe including information of a plurality of parameters, which specify operations of the manufacturing tools and are commonly set in the manufacturing processes.

Another aspect of the present invention inheres in a method for manufacturing products. The method includes making intermediate recipe data by merging product information for the products and process information for each of a plurality of manufacturing processes used for the products; making a recipe for each of a plurality of manufacturing tools by merging information of the intermediate recipe data and information of a basic recipe including information of a plurality of parameters, which specify operations of the manufacturing tools and are commonly set in the manufacturing processes; and manufacturing the products by using the manufacturing tools for which the parameters are set based on the recipe.

Still another aspect of the present invention inheres in a computer program product for making a recipe for each of a plurality of manufacturing tools configured to manufacture products. The computer program product includes instructions configured to merge product information for the products and process information for each of a plurality of manufacturing processes used for the products to make intermediate recipe data; and instructions configured to make the recipe for each of the manufacturing tools by merging information of the intermediate recipe data and information of a basic recipe including information of a plurality of parameters, which specify operations of the manufacturing tools and are commonly set in the manufacturing processes.

BRIEF DESCRIPTION OF DRAWINGS

FIG. 2 is a table showing exemplary information stored in a process information database of the automatic recipe making system according to the first embodiment of the present invention;

FIG. 3 is a table showing exemplary parameters to be set for corresponding manufacturing tools;

FIG. 4 is a table showing exemplary information stored in a product information database of the automatic recipe making system according to the first embodiment of the present invention;

FIG. 5 is a table showing other exemplary information stored in the product information database of the automatic recipe making system according to the first embodiment of the present invention;

FIG. 6 is a table showing other exemplary information stored in the product information database of the automatic recipe making system according to the first embodiment of the present invention;

FIG. 7 is an exemplary basic recipe corresponding table stored in a corresponding table database of the automatic recipe making system according to the first embodiment of the present invention;

FIG. 20 is a table showing exemplary information stored in a log database of the automatic recipe making system according to the third embodiment of the present invention;

FIG. 21 is an exemplary graph made by the automatic recipe making system according to the third embodiment of the present invention; and FIG. 22 is another exemplary graph made by the automatic recipe making system according to the third embodiment of the present invention.

DETAILED DESCRIPTION OF THE INVENTION

Figure 1:
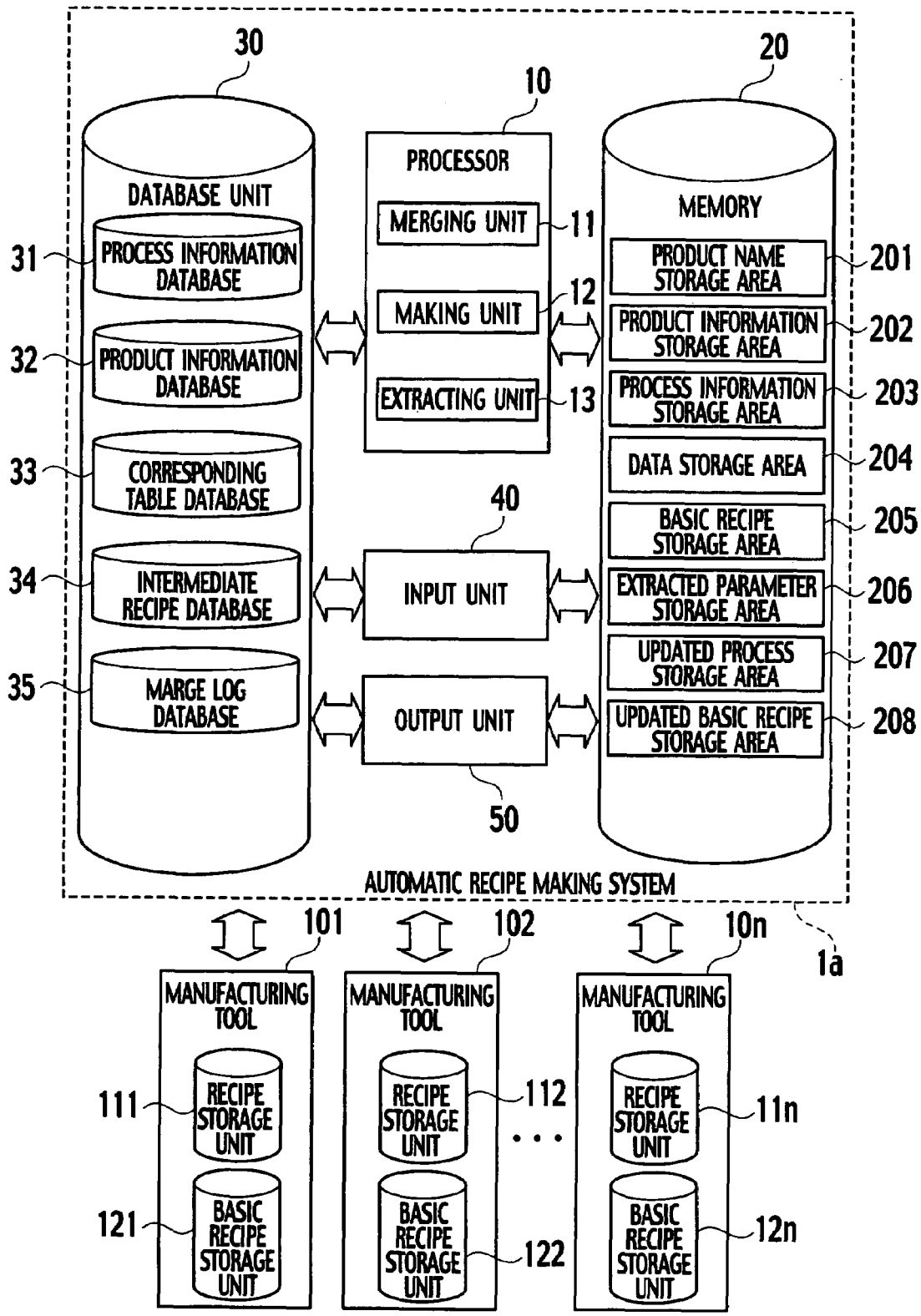
FIG. 1 shows a schematic structure of an automatic recipe making system according to a first embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

In the following descriptions, numerous specific details are set fourth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

(First Embodiment)

As shown in FIG. 1, an automatic recipe making system 1a, according to the first embodiment of the present invention, makes recipes for a plurality of manufacturing tools 101, 102, ..., 10n (where n is an integer of 2 or greater) used to manufacture products, and includes a processor 10, memory 20, a database unit 30, an input unit 40, and an output unit 50.

The processor 10 includes a merging unit 11 and a making unit 12. The merging unit 11 merges product information set for the product and process information set for each of a plurality of manufacturing processes used for the product and makes intermediate recipe data. The making unit 12 makes a recipe for each of the plurality of manufacturing tools 101, 102, ..., 10n by merging intermediate recipe data information and basic recipe information, which includes information of a plurality of parameters that specify respective operations of the manufacturing tools 101, 102, ..., 10n and that are commonly set in a plurality of manufacturing processes. The information commonly set in manufacturing processes is a default value in a manufacturing process, for example. In addition, the processor 10 includes an extracting unit 13, which extracts information to be modified from information stored in a process information database 31, a product information database 32, and a corresponding table database 33. 'Intermediate recipe data' is a set of a plurality of parameter information, which is specified for the products and respective manufacturing processes and which specify operations of the respective manufacturing tools 101, 102, ..., 10n. Accordingly, the intermediate recipe data is needed for making recipes of the respective manufacturing tools 101, 102, ..., 10n.

The memory 20 includes a product name storage area 201, a product information storage area 202, a process information storage area 203, a data storage area 204, a basic recipe storage area 205, an extracted parameter storage area 206, an updated process storage area 207, and an updated basic recipe storage area 208.

The product name storage area 201 stores the product name of products for which intermediate recipe data is made. The product information storage area 202 stores product information of products for which intermediate recipe data is made. The process information storage area 203 stores process information of each manufacturing process used to manufacture products for which intermediate recipe data is made. The data storage area 204 stores data needed for making recipes. The basic recipe storage area 205 stores basic recipes for the respective manufacturing tools 101, 102, ..., 10n. The extracted parameter storage area 206 stores parameters extracted from intermediate recipe data for the respective manufacturing tools 101, 102, ..., 10n. The updated process information storage area 207 stores an updated manufacturing process name. The updated basic recipe storage area 208 stores an updated basic recipe name.

The database unit 30 includes the process information database 31, the product information database 32, the corresponding table database 33, an intermediate recipe database 34, and a merge log database 35.

The process information database 31 is a memory that stores process information set for manufacturing processes for the respective manufacturing tools 101, 102, ..., 10n. A plurality of process information is parameters specifying operations of the respective manufacturing tools 101, 102, ..., 10n. In addition, process information includes manufacturing conditions (hereafter, referred to as 'process conditions') corresponding to design rules used to manufacture products. Even when the same model of manufacturing tool is used in the same manufacturing process, parameters for the manufacturing tools 101, 102, ..., 10n may be set differently between products manufactured based on a 0.1 μm design rule and products manufactured based on a 0.5

µm design rule. Therefore, process conditions used to manufacture products are stored in the process information database 31 as one of a plurality of process information. FIG. 2 is also a table showing exemplary information stored in the process information database 31. FIG. 2 is a table showing exemplary setting conditions for a manufacturing process A and a process condition σ for the manufacturing tool 101 shown in FIG. 1. In FIG. 2, when the manufacturing tool 101 is an aligner, parameters 1 through 5 are an alignment mark layer, an alignment method, a focus sensor, light intensity or the like.

A parameter common to the manufacturing tools 101, 102, ..., 10n is stored as a single parameter in the process information database 31. FIG. 3 is a table showing exemplary parameters necessary to be set for the respective manufacturing tools 101 through 103 shown in FIG. 1. FIG. 3 is also a table showing parameters that are necessary to be set, which are indicated with a symbol 'O'. In other words, parameters 1, 2, and 4 must be set for the manufacturing tool 101. In addition, parameters 1, 3, and 4 must be set for the manufacturing tool 102, and parameters 1, 4, and 5 must be set for the manufacturing tool 103. Therefore, common parameters for the manufacturing tools 101 through 103 are parameters 1 and 4. Accordingly, respective information of parameter 1 necessary to be set for the respective manufacturing tools 101 through 103 is collected into a single set of information, which is then stored in the process information database 31. Similarly, respective information of parameter 4 necessary to be set for the respective manufacturing tools 101 through 103 is collected into a single set of information, which is then stored in the process information database 31.

Note that process information shared among a plurality of manufacturing tools is converted to the same unit system and the same coordinate system, which is then stored in the process information database 31. In other words, information of the above mentioned common parameters specified in the same unit and the same coordinate system is stored in the process information database 31. For example, if the unit for parameter 1 is different for the respective manufacturing tools 101 through 103, parameter 1 is converted to be in the same unit system, which is then stored in the process information database 31. In addition, if the coordinate system for parameter 1 is different for the respective manufacturing tools 101 through 103, conversion to a value in the same coordinate system is carried out. For example, when coordinates are set with the center of a chip as the origin for the manufacturing tools 101 and 103, and coordinates are set with the corner of a chip as the origin for the manufacturing tool 102, the coordinates for the manufacturing tool 102 are converted to coordinates in the coordinate system with the center of a chip as the origin. Subsequent to conversion to a value in the same coordinate system, the resulting parameter 1 information is stored in the process information database 31. As described above, use of the same unit and the same coordinate system for common parameters for the manufacturing tools 101 through 103 eliminates separate management of the common parameters based on each of the manufacturing tools 101 through 103. Using the same unit and the same coordinate system reduces time for updating information stored in the process information database 31, due to modification of a manufacturing process.

On the other hand, in the case of parameters necessary to be set for only one of the manufacturing tools 101, 102, ..., 10n, information only of the manufacturing tools 101, 102, ..., 10n, for which a parameter must be set, is stored in the process information database 31. For example, parameter 2 shown in FIG. 3 is a parameter that must be set only for the manufacturing tool 101. Therefore, information needed for setting the manufacturing tool 101 is stored in the process information database 31 as information of parameter 2. Similarly, regarding parameters 3 and 5, information needed for setting the manufacturing tools 102 and 103 is stored in the process information database 31 as information of parameters 3 and 5, respectively.

The product information database 32 shown in FIG. 1 is a memory that stores product information set for the product to be manufactured. The product information is parameter information such as product names, and all manufacturing processes and manufacturing tools used to manufacture the product. FIGS. 4 through to 6 are tables showing exemplary information stored in the product information database 32. FIG. 4 is a table showing exemplary parameters for the manufacturing tool 101 utilized in a manufacturing process A for manufacturing a product X. For example, when the manufacturing tool 101 is an aligner, parameters 11 through 15 are an alignment mark layer, intensity of exposure, and a focus offset or the like. In addition, FIG. 5 is a table showing information of exemplary alignment marks for the manufacturing tool 101, which is stored in the product information database 32 when the manufacturing tool 101 is an aligner. In other words, when the manufacturing tool 101 is used for a product X, the information of alignment marks includes coordinates for respective alignment marks A, B, C, and D, and dimensions of the alignment marks. The information of alignment marks includes a large amount of data and is set as manufacturing tool specific information. Therefore, the product information database 32 generally receives the information of alignment marks directly from an automatic mark arranging tool, which automatically arranges alignment marks via the input unit 40. FIG. 6 is a table showing exemplary shot map information stored in the product information database 32 when the manufacturing tool 101 is an aligner. The shot map information includes shot settings such as step pitches and map offsets, and shot coordinates when the manufacturing tool 101 is used for the product X. The product information is converted to the same unit system and the same coordinate system, which is then stored in the product information database 32.

Furthermore, the corresponding table database 33 shown in FIG. 1 is a memory that stores basic recipe corresponding tables. Each of the basic recipe corresponding tables is set up so that basic recipe names are uniquely decided by specifying a process condition name, a manufacturing process name, and a manufacturing tool name, as shown in FIG. 7, for example.

In addition, the intermediate recipe database 34 shown in FIG. 1 is a memory that stores intermediate recipe data. The merge log database 35 is a memory that stores information for compiling intermediate recipe data.

A person who makes recipes is allowed to specify a product for which a recipe is made and a product manufacturing tool, and to enter commands for executing or aborting recipe making via the input unit 40. Furthermore, the person who makes recipes can input and modify information stored in the process information database 31, the product information database 32, and the corresponding table database 33 via the input unit 40. In addition, information to be stored in the aforementioned databases may be input from another database or manufacturing tools not shown in the drawing via a communication line and the input unit 40. Therefore, the input unit 40 may include a keyboard, a mouse pointer, a light pen, and a flexible disk unit.

In addition, the output unit 50 includes a display and a printer, which display recipe contents and update logs, or a recording unit, which stores a computer readable recording medium. A 'computer readable recording medium' means a medium such as an internal or external memory device for a computer, semiconductor memory, a magnetic disk, an optical disk, a magnetic optical disk, or a magnetic tape, which may store electronic data. More specifically, a 'computer readable recording medium' may be a flexible disk, a compact disk read only memory (CD-ROM), a magneto-optics (MO) disk, a cassette tape, or an open reel tape.

Recipes for the respective manufacturing tools 101, 102, . . . , 10n are made for the product and respective manufacturing processes. Therefore, recipes for the respective manufacturing tools 101, 102, . . . , 10n are made by the automatic recipe making system 1a shown in FIG. 1 based on information in the process information database 31 and the product information database 32. Dividing necessary information for recipe making into information of the process information database 31 and information of the product information database 32 and managing the databases 31 and 32 further reduces the total amount of data compared to storing information of all combinations of product and manufacturing processes in a single database. In addition, when a product specification is modified or when a new kind of product is added, only information included in the product information database 32 should be updated, and updating of information included in the process information database 31 is unnecessary. On the other hand, when a manufacturing process is added or modified, only information included in the process information database 31 should be updated. This reduces the amount of data to be updated, further reducing the time for updating compared to managing information of all combinations of the product and manufacturing processes.

Parameter information independent of manufacturing processes for the manufacturing tools 101, 102, . . . , 10n, such as the amount of misalignment from a predetermined position on a wafer mounting stage, is stored as a basic recipe in basic recipe storage units 121, 122, . . . , 12n in the respective manufacturing tools 101, 102, . . . , 10n. Basic recipes for the respective manufacturing tools 101, 102, . . . , 10n and for respective manufacturing processes may be stored in the process information database 31. However, since basic recipe information of different manufacturing processes or different products manufactured therethrough do not differ from one another, it is unnecessary to store and collectively manage such basic recipes in the process information database 31.

Note that information of common parameters for manufacturing processes for the respective manufacturing tools 101, 102, . . . , 10n may differ due to a difference in process conditions. In this case, basic recipe information must be modified according to process conditions. Therefore, information of parameters that are common for manufacturing processes for respective manufacturing tools 101, 102, . . . , 10n, and that are different from one another due to process conditions is stored in the process information database 31. Alternatively, a plurality of basic recipes that satisfy a plurality of process conditions for the respective manufacturing tools 101, 102, . . . , 10n may be stored in the basic recipe storage units 121, 122, . . . , 12n. However, respective information stored in the basic recipe storage units 121, 122, . . . , 12n cannot be modified at the same time. Therefore, it is preferred that parameters dependent on process conditions are stored in the process information database 31. Note that the recipes for the manufacturing tools 101, 102, . . . , 10n are stored in recipe storage units 111, 112, . . . , 11n of the respective manufacturing tools 101, 102, . . . , 10n.

Figures 8, 9:
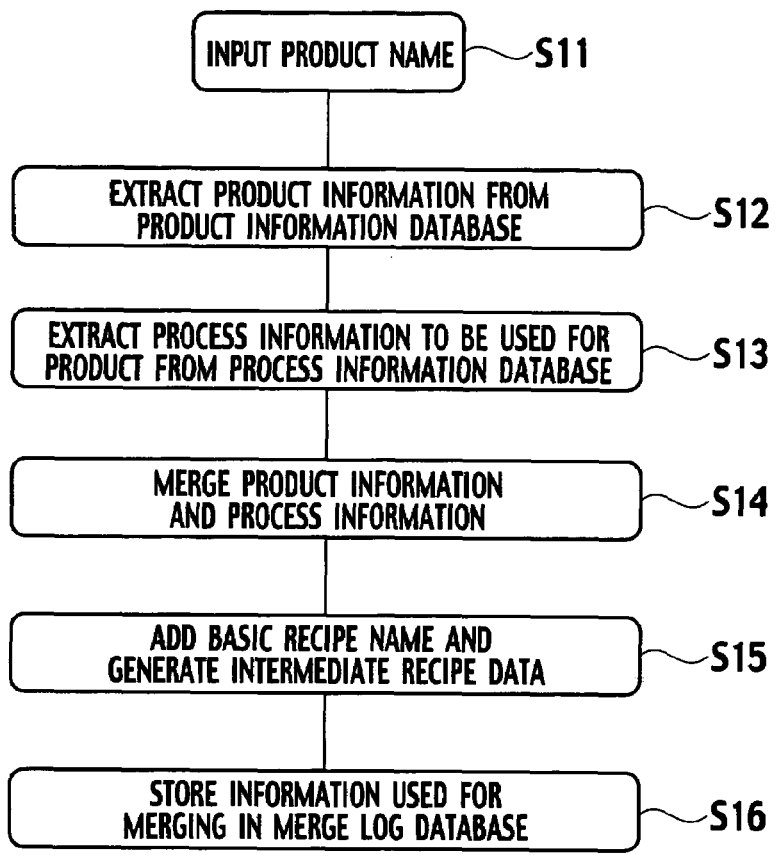
FIG. 8 is a flowchart describing an intermediate recipe data making method according to the first embodiment of the present invention.
FIG. 9 is a table showing exemplary information stored in a merge log database of the automatic recipe making system according to the first embodiment of the present invention.

An example of making or compiling intermediate recipe data by the automatic recipe making system 1a shown in FIG. 1 is described forthwith using a flowchart shown in FIG. 8. The intermediate recipe data includes process conditions for the product and parameter information of the product and for the respective manufacturing tools 101, 102, . . . , 10n, which are utilized in manufacturing processes. An example of making intermediate recipe data for the product X is described below.

In step S11 of FIG. 8, a product name of the product X for which intermediate recipe data is to be made is stored in the product name storage area 201 via the input unit 40 shown in FIG. 1.

In step S12, the merging unit 11 reads a product name from the product name storage area 201. The merging unit 11 then extracts product information regarding the product X from the product information database 32 based on the read product name. The extracted product information is stored in the product information storage area 202.

In step S13, the merging unit 11 reads product information regarding the product X from the product information storage area 202. The merging unit 11 then extracts process information from the process information database 31, such as manufacturing processes and manufacturing tools for the product X, based on the product information for the product X. The extracted process information is stored in the process information storage area 203.

In step S14, the merging unit 11 reads product information from the product information storage area 202 and process information from the process information storage area 203. The merging unit 11 then merges the product information and process information and produces the necessary data for making a recipe for the product X. The necessary data for making the recipe for the product X is stored in the data storage area 204.

In step S15, the merging unit 11 reads necessary data for recipe making stored in the data storage area 204. The merging unit 11 extracts basic recipe names from the corresponding table database 33, based on the process condition name, manufacturing process name, and manufacturing tool name for respective parameters included in the necessary data for making the recipe. The merging unit 11 then adds the extracted basic recipe names to respective parameters corresponding to necessary data for making the recipe, and makes intermediate recipe data. The intermediate recipe data is stored in the intermediate recipe database 34.

In step S16, the merging unit 11 stores information for making intermediate recipe data in the merge log database 35. More specifically, information such as the process condition name, the manufacturing process name, the product name, the manufacturing tool name, and the basic recipe name shown in FIG. 9 are stored in the merge log database 35.

A case where storing necessary information in the process information database 31, the product information database 32, and the corresponding table database 33, for making or compiling intermediate recipe data such as process conditions, manufacturing processes, and manufacturing tools for a product has been described above. When necessary information for making intermediate recipe data is not stored in the aforementioned databases, necessary information for making intermediate recipe data should be pre-stored in the respective databases via the input unit 40.

As described above, respective information of common parameters for the respective manufacturing tools 101, 102, . . . , 10n stored in the process information database 31 are converted into corresponding information of common parameters in the same unit system and the same coordinate system. Therefore, the common parameters for the plurality of manufacturing tools 101, 102, . . . , 10n that are included in the intermediate recipe data are converted to corresponding common parameters in the same unit system and the same coordinate system. The intermediate recipe data is written in Extensible Markup Language (XML), for example.

Figures 10, 11A, 11B, 11C:
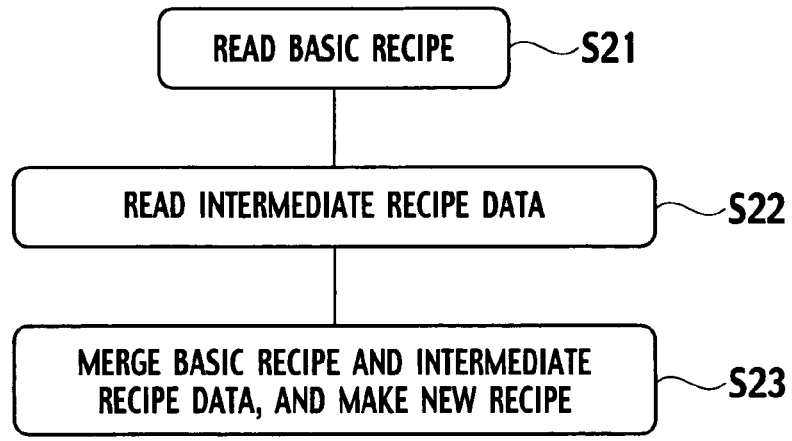
FIG. 10 is a flowchart describing an automatic recipe making method according to the first embodiment of the present invention.
FIG. 11A is a table showing parameters for a basic recipe according to the first embodiment of the present invention.
FIG. 11B is a table showing parameters extracted from intermediate recipe data using the automatic recipe making method according to the first embodiment of the present invention.
FIG. 11C is a table showing parameters of a recipe made by the automatic recipe making method according to the first embodiment of the present invention.

A method for making a new recipe, using intermediate recipe data, by the automatic recipe making system 1a shown in FIG. 1 is described by referring to the flowchart shown in FIG. 10. In the following, a case where making a recipe for the manufacturing tool 101 shown in FIG. 1 is exemplified. A basic recipe for the manufacturing tool 101 is stored in the basic recipe storage area 121.

In step S21 of FIG. 10, the making unit 12 shown in FIG. 1 reads the basic recipe for the manufacturing tool 101 from the basic recipe storage area 121 of the manufacturing tool 101. The read basic recipe data is stored in the basic recipe storage area 205.

In step S22, the making unit 12 extracts parameters for the manufacturing tool 101 from the intermediate recipe database 34. Parameters in the intermediate recipe data common to the manufacturing tools 101, 102, . . . , 10n along with parameter information of the respective manufacturing tools 101, 102, . . . , 10n are stored in the intermediate recipe database 34. Therefore, the making unit 12 extracts only parameter information of the manufacturing tool 101. The extracted parameters for the manufacturing tool 101 are converted to corresponding parameters in the same unit system and the coordinate system used for the manufacturing tool 101, which are then stored in the extracted parameter storage area 206.

In step S23, the making unit 12 reads a basic recipe from the basic recipe storage area 205 and the extracted parameters from the extracted parameter storage area 206. The making unit 12 then merges information of the basic recipe and information of the extracted parameters, and makes a new recipe. The new recipe is stored in the recipe storage unit 111 of the manufacturing tool 101.

In step S23, if the basic recipe and the extracted parameters include the same parameters, the parameters for the basic recipe are overwritten when information of the basic recipe and information of the extracted parameters is merged, thereby making a new recipe. In other words, intermediate recipe data including parameters that constitute a basic recipe that is to be modified and parameters to be added should be made. An example of making a new recipe by merging a basic recipe and extracted parameters is described using FIGS. 11A through 11C. When making a new recipe by merging a basic recipe having parameters shown in FIG. 11A and an extracted parameter shown in FIG. 11B, parameter B is the same parameter. Therefore, a new recipe is made having data shown in FIG. 11C, which is provided by overwriting data of parameter B shown in FIG. 11A with data of parameter B shown in FIG. 11B.

Figure 12:
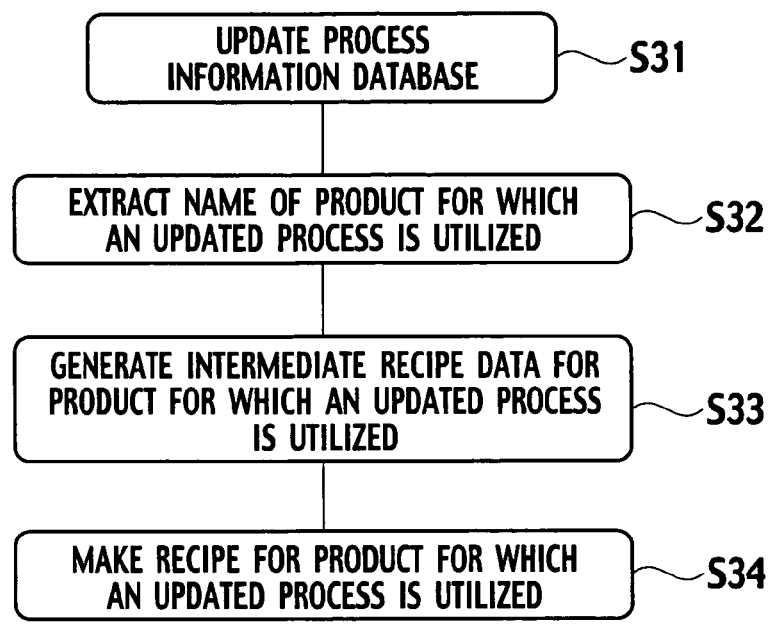
FIG. 12 is a flowchart describing a method for updating a process information database of the automatic recipe making system according to the first embodiment of the present invention.

Next, a case of updating information included in the process information database 31 shown in FIG. 1 is described using a flowchart of FIG. 12.

In step S31, process conditions or a manufacturing process stored in the process information database 31 is updated via the input unit 40 in FIG. 1. Updated process conditions or an updated manufacturing process name is stored in the updated process storage area 207. Hereafter, information stored in the updated process storage area 207 is referred to as an 'updated process name'. Updated process conditions or an updated manufacturing process is referred to as an 'updated process'.

In step S32, the extracting unit 13 reads an updated process name from the updated process storage area 207. The extracting unit 13 then extracts all product names of the product, for which an updated process is utilized, from the merge log database 35, based on the read updated process name. The extracted product names are stored in the product name storage area 201.

In step S33, the merging unit 11 makes intermediate recipe data for products of all product names stored in the product name storage area 201 using the method described in FIG. 8. In other words, the merging unit 11 extracts product information from the product information database 32 based on a product name stored in the product name storage area 201. The intermediate recipe data for all products that utilize an updated process is then made from the extracted product information, updated information in the process information database 31, and information in the corresponding table database 33. The intermediate recipe data is stored in the intermediate recipe database 34. In addition, information used to make the intermediate recipe data is stored in the merge log database 35.

In step S34, the making unit 12 merges a basic recipe and the intermediate recipe data made in step S33 using the method described in FIG. 10, and makes a new recipe.

As described above, according to the automatic recipe making system 1a shown in FIG. 1, when information stored in the process information database 31 is modified, recipes for all products that utilize updated process conditions or updated manufacturing processes may be updated.

Figure 13:
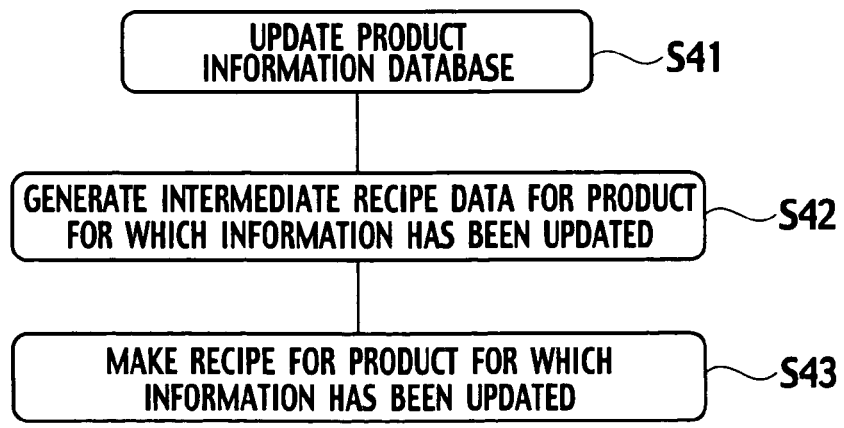
FIG. 13 is a flowchart describing a method for updating a product information database of the automatic recipe making system according to the first embodiment of the present invention.

A case of updating information in the product information database 32 shown in FIG. 1 is described using a flowchart of FIG. 13.

In step S41, product information stored in the product information database 32 is updated via the input unit 40 in FIG. 1. A product name of a product for which information has been updated is stored in the product name storage area 201.

In step S42, the merging unit 11 makes intermediate recipe data for products of all product names stored in the product name storage area 201 using the method described in FIG. 8. In other words, the merging unit 11 extracts product information from the product information database 32, based on a product name stored in the product name storage area 201. The intermediate recipe data for products for which information has been updated in step S41 is then made from the extracted product information, information in the process information database 31, and information in the corresponding table database 33. The intermediate recipe data is stored in the intermediate recipe database 34. In addition, information used to make the intermediate recipe data is stored in the merge log database 35.

In step S43, the making unit 12 merges a basic recipe and the intermediate recipe data made in step S42 using the method described in FIG. 10, making a recipe for a product for which information has been updated.

As described above, according to the automatic recipe making system 1a shown in FIG. 1, when information stored in the process information database 32 is updated, all recipes used to manufacture products for which information has been updated may be updated.

Figure 14:
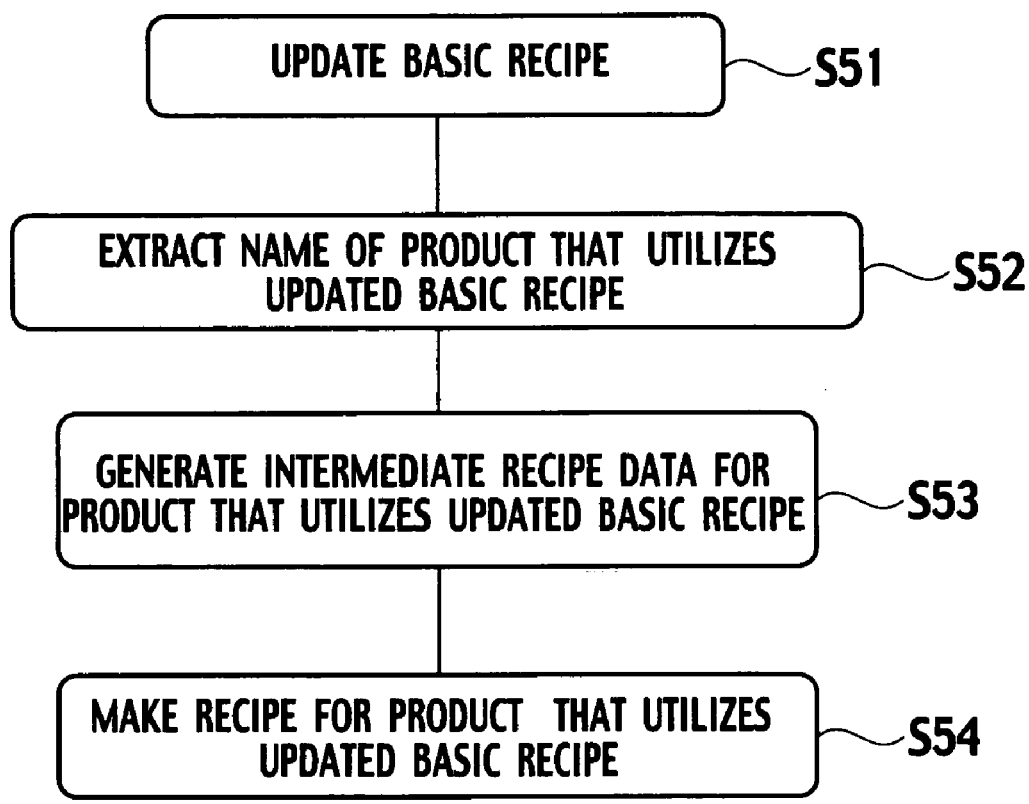
FIG. 14 is a flowchart describing a method for updating a basic recipe in the automatic recipe making system according to the first embodiment of the present invention.

Next, a case of updating a basic recipe is described using a flowchart of FIG. 14. A case of updating a basic recipe for the manufacturing tool 101 shown in FIG. 1 is exemplified.

In step S51, a basic recipe stored in the basic recipe storage unit 121 of the manufacturing tool 101 is updated via the input unit 40 in FIG. 1. The updated basic recipe name is stored in the updated basic recipe storage area 208.

In step S52, the extracting unit 13 reads the updated basic recipe name from the updated basic recipe storage area 208. The extracting unit 11 then extracts all names of products that utilize an updated basic recipe from the merge log database 35, based on the read basic recipe name. The extracted product names are stored in the product name storage area 201.

In step S53, the merging unit 11 makes intermediate recipe data for products of all product names stored in the product name storage area 201 using the method described in FIG. 8. In other words, the merging unit 11 extracts product information from the product information database 32, based on a product name stored in the product name storage area 201. The intermediate recipe data for all products that utilize an updated basic recipe is made from the extracted product information, information in the process information database 31, and information in the corresponding table database 33. The intermediate recipe data is stored in the intermediate recipe database 34. In addition, information used to make the intermediate recipe data is stored in the merge log database 35.

In step S54, the making unit 12 merges the updated basic recipe and the intermediate recipe data made in step S53 using the method described in FIG. 10, and makes a new recipe.

As described above, according to the automatic recipe making system 1a shown in FIG. 1, when a basic recipe is updated, recipes for all products that utilize the updated basic recipe may be updated.

A case of updating a basic recipe for the manufacturing tool 101 via the input unit 40 shown in FIG. 1 in step S51 is described above. Alternatively, a basic recipe for the manufacturing tool 101 may be updated via another input unit in the manufacturing tool 101, which is not shown in the drawing. In such a case, in step S51, the updated basic recipe name is input to the updated basic recipe storage area 208 via the input unit 40 shown in FIG. 1.

A series of recipe making operations shown in FIGS. 8 and 10 may be carried out by controlling the automatic recipe making system 1a shown in FIG. 1 by use of a program having an algorism equivalent to that shown in FIGS. 8 and 10. This program should be stored in the memory 20 of the automatic recipe making system 1a shown in FIG. 1. In addition, a series of recipe making operations of the present invention may be carried out by storing this program in a computer-readable recording medium and instructing the memory 20 shown in FIG. 1 to read the recording medium.

In addition, products may be manufactured by using the manufacturing tools 101, 102,..., 10n for which respective parameters are set, based on the made recipes. For example, use of a semiconductor manufacturing tool for which respective parameters are set, based on a recipe, allows manufacturing of a semiconductor device. An example of manufacturing a semiconductor device by making a recipe for an aligner is described using a flowchart of FIG. 15.

In step S101, a new recipe for an aligner is made by the methods described in FIGS. 8 and 10. In other words, intermediate recipe data for an aligner is made from product information and process information of a semiconductor device to be manufactured. A new recipe for an aligner is made by merging a basic recipe for the aligner and the intermediate recipe data.

In step S102, parameters for the aligner are set based on the recipe made in step S101.

In step S103, a photo resist film is applied to a semiconductor substrate and is exposed to transfer a desired mask pattern by using the aligner for which parameters are set in step S102.

Figure 15:
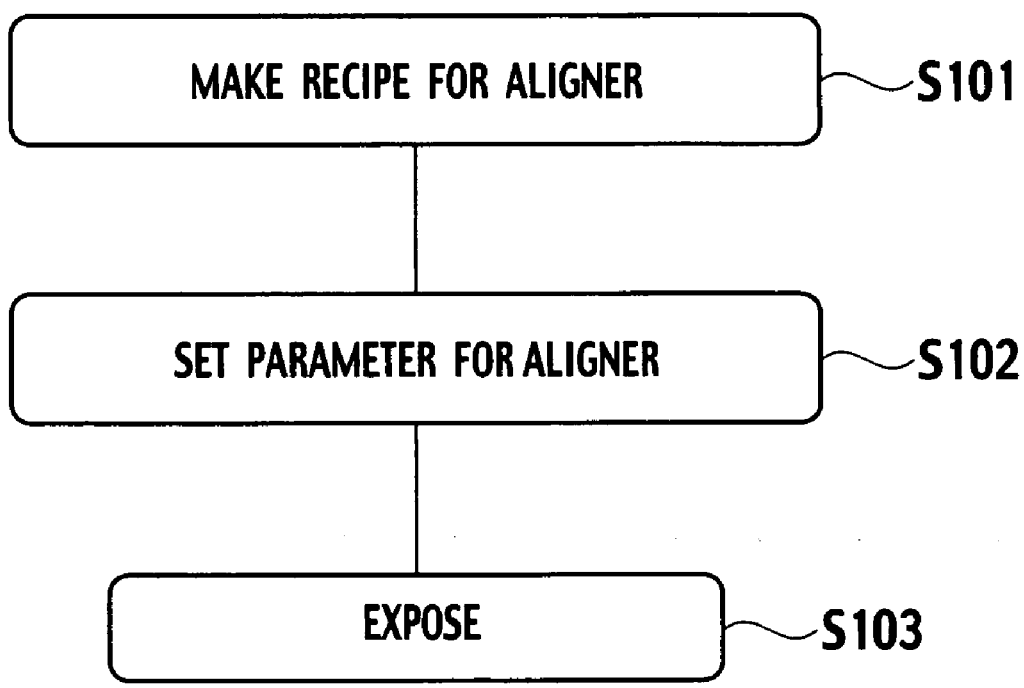
FIG. 15 is a flowchart describing an example of manufacturing products by using the automatic recipe making method according to the first embodiment of the present invention.

FIG. 15 shows only an exposing step of manufacturing processes for a semiconductor manufacturing process. In other words, before the manufacturing process shown in FIG. 15, the semiconductor substrate is covered with the photo resist film. In addition, after the manufacturing process shown in FIG. 15, a semiconductor device is subjected to an etching the substrate process using the photo resist film as a mask.

An example of an aligner as a semiconductor manufacturing tool is described above. An automatic recipe making method, according to this embodiment, is applicable to making recipes for semiconductor manufacturing tools, such as an oxidation furnace, a diffusion furnace, an ion implantation system, a chemical vapor deposition (CVD) system, a sputtering system, a vacuum evaporation system, a heating system, an etching system, or a cleaning system. In addition, a semiconductor device to be manufactured may be a memory or a logic circuit, for example.

According to the automatic recipe making system 1a of the first embodiment of the present invention, parameter information of the respective manufacturing tools 101, 102, ..., 10n used in product manufacturing processes and information of process conditions used to manufacture the product are made as intermediate recipe data. Making and modifying a recipe using the intermediate recipe data reduces the amount of entry operations for making and updating recipes. This reduces the time for making and modifying recipes and reduces input error. As a result, the frequency of failure products due to input errors may be reduced, resulting in an improved yield. Furthermore, when manufacturing products, the time for resetting of recipes may be reduced, resulting in improvement in the total throughput. Moreover, since the process information database 31 is structured using the same unit system and the same coordinate system for common parameters for the manufacturing tools 101, 102, ..., 10n, it is unnecessary to manage common parameters for respective manufacturing tools one by one. Moreover, use of information included in the merge log database 35 is automatically reflected in all recipes that are affected by the update of the process information database 31, the product information database 32, and/or a basic recipe. Furthermore, sharing necessary information for recipe making, which is stored in the intermediate recipe database 34, by a plurality of manufacturing tools allows sharing of the results of recipe modification and technical know-how.

(Second Embodiment)

Figure 16:
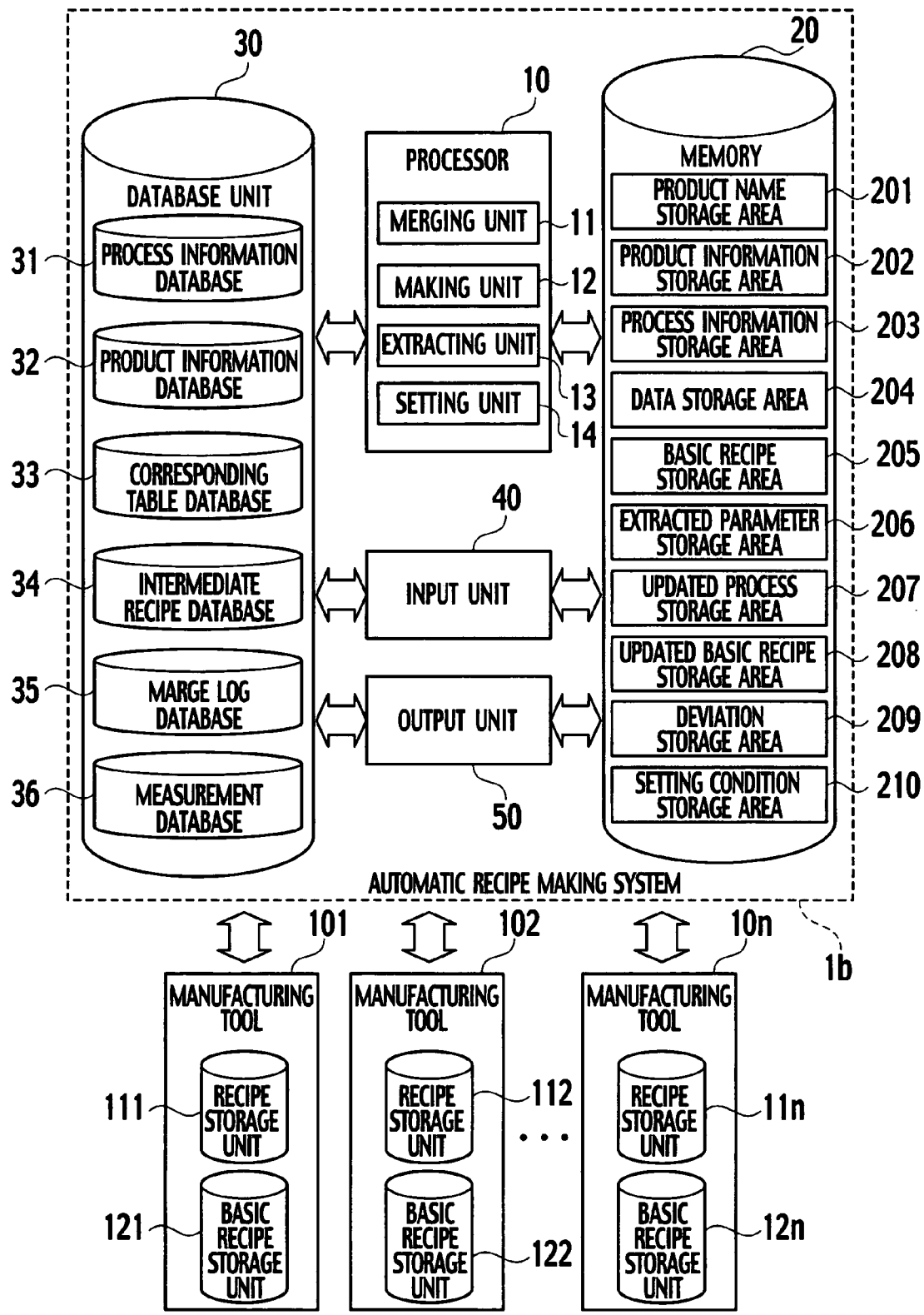
FIG. 16 shows a schematic structure of an automatic recipe making system according to a second embodiment of the present invention.

As shown in FIG. 16, an automatic recipe making system 1b, according to the second embodiment of the present invention, differs from the automatic recipe making system 1a shown in FIG. 1 by further including a setting unit 14, a deviation storage area 209, a setting condition storage area 210, and a measurement database 36. The other elements are the same as that of the first embodiment shown in FIG. 1. The setting unit 14 sets parameters for manufacturing tools based on a deviation calculated from examination and measurement data obtained in a manufacturing process. The calculated deviation is stored in the deviation storage area 209. Conditions referenced by the setting unit 14 are stored in the setting condition storage area 210. The measurement database 36 is a memory that stores examination and measurement data. According to the automatic recipe making system 1b shown in FIG. 16, recipes may be updated based on examination and measurement data.

In general, an early stage of processing of a new manufacturing process is not stabilized. Then, for example, a somewhat greater number of shots for alignment by a photolithography process (hereafter, referred to as the 'number of sampling shots') must be set. However, since an increase in the number of sampling shots causes a decrease in throughput, the number of sampling shots must be reduced after the manufacturing process is stabilized.

An example of the automatic recipe making system 1b shown in FIG. 16 modifying the number of sampling shots in a photolithography manufacturing process D, is described below. In the following, an exemplary method for setting the number of sampling shots in the manufacturing process D using examination and measurement data obtained through the manufacturing process D and updating recipes is described using a flowchart in FIG. 17.

In step S61, a testing tool measures amounts of misalignment due to respective shots for alignment in the manufacturing process D. 'Amount of misalignment' means the distance between an alignment mark formed on a wafer resulting from a stepper transcribing a mask pattern on the wafer in the manufacturing process D and a preformed alignment mark on the wafer. In general, the higher the alignment accuracy, the closer to zero is the amount of misalignment. The measured amount of each misalignment of respective shots is stored in the measurement database 36 via the input unit 40.

In step S62, the setting unit 14 reads the amounts of misalignment stored in the measurement database 36 and then calculates deviation in the amounts of misalignment that occurred due to shots for alignment. The calculated deviation is stored in the deviation storage area 209. The deviation in the amounts of misalignment may be used as a rough standard for stabilizing the processing of the manufacturing process D. More specifically, it can be determined that the smaller the deviation in the amount of misalignment, the higher the degree of stabilization of the processing performed in the manufacturing process D.

Figures 17, 18:
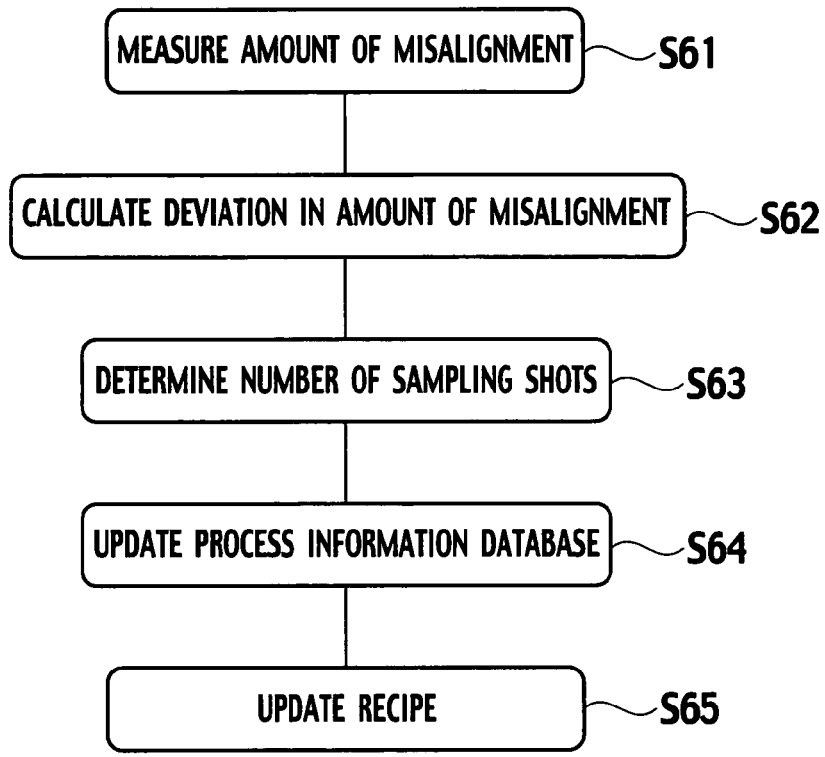
FIG. 17 is a flowchart describing an automatic recipe making method according to the second embodiment of the present invention.
FIG. 18 is a table showing exemplary conditions to be referenced when modifying a recipe made by the automatic recipe making system according to the second embodiment of the present invention.

In step S63, the setting unit 14 sets the number of sampling shots based on the deviation in the amounts of misalignment and conditions stored in the setting condition storage area 210, shown in FIG. 18. More specifically, the number of sampling shots is set to be either k1, k2, or k3 based on deviation "1 or "2 shown in FIG. 18. The smaller the deviation in the amounts of misalignment, the smaller the number of sampling shots is set.

In step S64, the setting unit 14 sends the number of sampling shots set in step S63 to the process information database 31 and then updates the number of sampling shots for the manufacturing process D.

In step S65, recipes for products for which processing in the manufacturing process D is utilized are updated using the method described in FIG. 12. In other words, recipes for all products for which processing in the manufacturing process D is utilized are updated based on the updated information in the process information database 31 and the merge log database 35.

As a result, according to the automatic recipe making system 1b shown in FIG. 16, all recipes for products for which the manufacturing process D is used, other than products for which amounts of misalignment have been measured, can be updated simultaneously. In addition, while an example of modifying the number of sampling shots for alignment has been described above, modification of parameters to be stored in the process information database 31 is possible. Furthermore, it is possible not only to modify recipes using examination and measurement data, but also to analyze the amount of misalignment through simulation and then modify recipes using the analysis results.

As described above, according to the automatic recipe making system 1b of the second embodiment of the present invention, calculation of deviation in examination and measurement data, such as the amount of misalignment, allows an update of process information stored in the process information database 31, based on the degree of stabilization of the processing operation of manufacturing processes. In addition, update of recipes based on the updated process information allows feedback of the deviation in examination and measurement data to the recipes. Products manufactured using recipes modified by examination and measurement data improves yield and reduces deviation in product performances. Since the remainder of the operation is substantially the same as that of the first embodiment, a repetitive description thereof is omitted.

(Third Embodiment)

Figure 19:
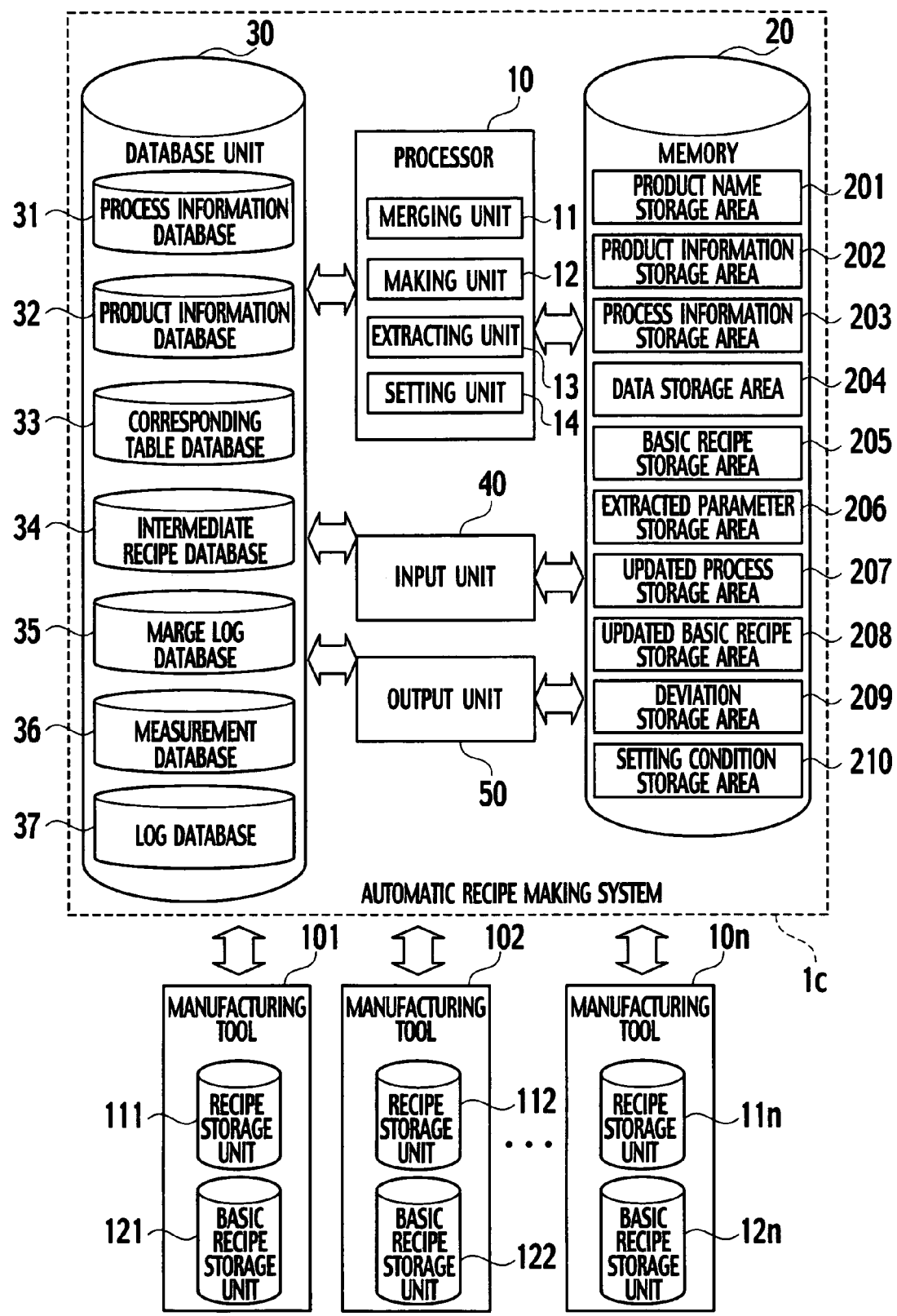
FIG. 19 shows a schematic structure of an automatic recipe making system according to a third embodiment of the present invention.

As shown in FIG. 19, an automatic recipe making system 1c, according to the third embodiment of the present invention, differs from the automatic recipe making system 1b shown in FIG. 16 by further including a log database 37. The other elements are the same as that of the second embodiment shown in FIG. 16. The log database 37 is a memory that stores logs for making and updating recipes. In other words, the log database 37 stores logs for processing, such as adding and updating data in the process information database 31, the product information database 32, and the corresponding table database 33, making new recipes and updating basic recipes. For example, a date when information is updated, an updated parameter name, and values before and after updating as shown in FIG. 20 are stored in the log database 37. According to the automatic recipe making system 1c shown in FIG. 19, a correlation between recipe modification log and examination and measurement data for products may be found based on information stored in the log database 37.

In product failure analysis, examination and measurement data such as the amount of misalignment stored in the measurement database 36 may be generated as a time-series graph for lots or wafers. A graph as shown in FIG. 21 may be made by overlapping that time-series graph with a graph of the recipe modification log stored in the log database 37. The vertical axis of the graph of FIG. 21 represents misalignment measurements while the horizontal axis represents lot numbers arranged in time series. FIG. 21 shows the increased amounts of misalignment for lots for which a modified recipe is used. Lots and wafers for which a modified recipe is used can be identified from dates of updating information stored in the log database 37. In other words, it is possible to compare the times when examination and measurement data for lots or wafers changes and the times when recipes for products or manufacturing processes are modified. This allows easy confirmation of whether or not recipe modification affects examination and measurement data for lots or wafers.

In addition, the time-series graph shown in FIG. 21 may be displayed on the display of the output unit 50, and recipe update logs of product names, manufacturing process names, and wafers stored in the log database 37 may also be displayed. A list of information stored in the log database 37 shown in FIG. 20 may be displayed by the output unit 50. Parameters may be arbitrarily selected from the displayed list, and a time-series graph for lots regarding the selected parameters may be displayed on the output unit 50. This allows a quick examination of recipe updated contents which affect examination and measurement data for lots or wafers.

In addition, dividing examination and measurement data for wafers into data before and after a recipe is updated and then box plot displaying the divided data allows quantitative examination of the influences of an updated recipe on examination and measurement data for wafers. For example, FIG. 22 is a box plot graph showing a comparison of the measurements of misalignments before and after a recipe is updated. It is found from FIG. 22 that the amounts of misalignment are smaller after the recipe is updated than before. In addition, dividing examination and measurement data into data before and after a plurality of recipes are updated allows the degree of influence of updated recipes on the examination and measurement data to be placed in order.

Furthermore, it is possible to examine not only the influence of an updated recipe on examination and measurement data, but also correlation between an updated recipe and yields of lots or wafers, or correlation between an updated recipe and deviation in product performance. Therefore, information stored in the log database 37 is available for failure analysis.

As described above, according to the automatic recipe making system 1c of the third embodiment of the present invention, correlation between recipe update logs and examination and measurement data for products may be examined. Updating recipes which affect examination and measurement data improves product yield and decreases deviation in product performance. Moreover, correlation information between recipes and product performance or the like may be used for developing a new product. Since other elements of the embodiment are substantially the same as that of the first embodiment, a repetitive description thereof is omitted.

OTHER EMBODIMENTS

While examples of storing basic recipes in the corresponding manufacturing tools 101, 102, ..., 10n have been described in the first through the third embodiment, basic recipes for the respective manufacturing tools 101, 102, ..., 10n may be stored in a single database and collectively managed. In addition, the first through to the third embodiments have exemplarily described the recipe making methods for semiconductor device manufacturing tools. Alternatively, it is easily perceived from the above descriptions that the present invention is available for making recipes for manufacturing tools such as an automobile manufacturing tool, a chemical manufacturing tool, and a building component manufacturing tool.

Various modifications will become possible for those skilled in the art after receiving the teachings of the present disclosure without departing from the scope thereof.

What is claimed is:

1. A system for making a recipe for each of a plurality of manufacturing tools configured to manufacture products, comprising:
a merging unit configured to merge product information for the products and process information for each of a plurality of manufacturing processes assigned for manufacturing the products to make intermediate recipe data, the product information including information of the manufacturing tools, the process information including common parameters shared among the manufacturing tools; and
a making unit configured to make the recipe for each of the manufacturing tools by merging information of the intermediate recipe data and information of a basic recipe including information of a plurality of specific parameters of the manufacturing tools, the specific parameters of each of the manufacturing tools specifying operations of each of the manufacturing tools and being independent of the manufacturing processes and the products.

2. The system of claim 1, wherein the product information includes information of manufacturing processes.

3. The system of claim 1, wherein the process information includes information of manufacturing conditions corresponding to design rules used for the products.

4. The system of claim 1, further comprising:
a product information database configured to store the product information; and
a process information database configured to store the process information.

5. The system of claim 4, wherein the common parameters shared among the manufacturing tools are converted to corresponding common parameters for the process information in another unit system and coordinate system having the same configuration, which are then stored in the process information database.

6. The system of claim 1, further comprising a merge log database configured to store information used for making the intermediate recipe data.

7. The system of claim 6, wherein the information used for making the intermediate recipe data includes at least one of a manufacturing condition name, a manufacturing process name, a product name, and a manufacturing tool name.

8. The system of claim 1, further comprising a setting unit configured to set the specific parameters based on examination and measurement data obtained from the manufacturing processes.

9. The system of claim 1, further comprising a log database configured to store a log for making and updating the recipes.

10. The system of claim 1, wherein the manufacturing tools manufacture a semiconductor integrated circuit.

11. A method for manufacturing products, comprising:
making intermediate recipe data by merging product information for the products and process information for each of a plurality of manufacturing processes assigned for manufacturing the products, the product information including information of the manufacturing tools, the process information including common parameters shared among the manufacturing tools;
making a recipe for each of a plurality of manufacturing tools by merging information of the intermediate recipe data and information of a basic recipe including information of a plurality of specific parameters of the manufacturing tools, the specific parameters of each of the manufacturing tools specifying operations of each of the manufacturing tools and being independent of the manufacturing processes and the products; and
manufacturing the products by using the manufacturing tools for which the specific parameters are set based on the recipe.

12. The method of claim 11, wherein the product information includes information of manufacturing processes.

13. The method of claim 11, wherein the process information includes information of manufacturing conditions corresponding to design rules used for the products.

14. The method of claim 11, further comprising converting the common parameters shared among the manufacturing tools to corresponding common parameters for the process information in another unit system and coordinate system having the same configuration.

15. The method of claim 11, further comprising storing information used for making the intermediate recipe data.

16. The method of claim 15, wherein the information used for making the intermediate recipe data includes at least one of a manufacturing condition name, a manufacturing process name, a product name, and a manufacturing tool name.

17. The method of claim 11, further comprising setting the specific parameters based on examination and measurement data obtained from the manufacturing processes.

18. The method of claim 11, further comprising storing a log database of a log for making and updating the recipes.

19. The method of claim 11, wherein the manufacturing tools manufacture a semiconductor integrated circuit.

20. A computer program product for making a recipe for each of manufacturing tools configured to manufacture of products, comprising:

instructions configured to merge product information for the products and process information for each of a plurality of manufacturing processes assigned for manufacturing the products to make intermediate recipe data, the product information including information of the manufacturing tools, the process information including common parameters shared among the manufacturing tools; and instructions configured to make the recipe for each of the manufacturing tools by merging information of the intermediate recipe data and information of a basic recipe including information of a plurality of specific parameters of the manufacturing tools, the specific parameters of each of the manufacturing tools specifying operations of each of the manufacturing tools and being independent of the manufacturing processes and the products.

* * * * *